Jan. 7, 1936.   W. SHELDON   2,026,709
POWER SYSTEM FOR WELL DRILLING
Filed Nov. 30, 1932
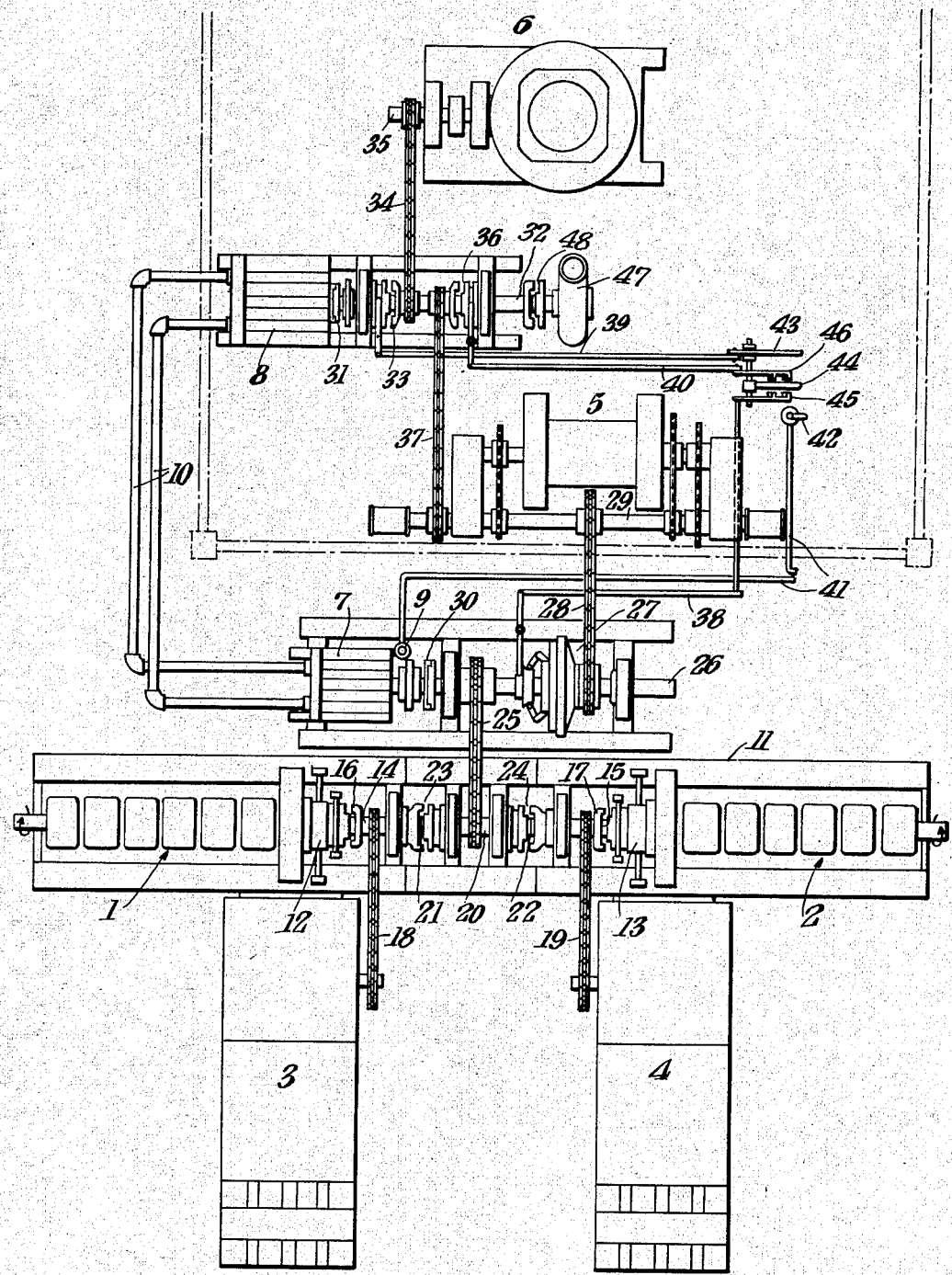
INVENTOR
WALDO SHELDON
BY Philip S. McLean
ATTORNEY Patented Jan. 7, 1936

2,026,709

UNITED STATES PATENT OFFICE 2,026,709

POWER SYSTEM FOR WELL DRILLING

Waldo Sheldon, South Norwalk, Conn.

Application November 30, 1932, Serial No. 644,978

12 Claims. (Cl. 255—19)

In the drilling of oil wells, steam has been considered the ideal power because of the wide range of power output and flexibility to suit the various operations about the drilling rig. The numerous disadvantages however generally offset the advantages. Particularly to be mentioned are the fire hazard set up by the use of the boiler and the requirement for an adequate supply of water for the boiler. Electric drive has flexibility but also involves a fire hazard and requires especially heavy and expensive equipment.

Internal combustion engines and particularly those of the Diesel type provide an ideal power from the standpoint of economy and general practicability but, due to their operating characteristics, lack the flexibility desired. Also, such engines if furnished in the power requisite for the heavier operations, must operate uneconomically for the lighter operations.

The objects of this invention are to utilize the advantages of the internal combustion engine drive and to attain with that the flexibility and control ordinarily associated with steam engine drive.

These objects are attained by the novel features of construction, combinations, arrangements and relations of parts as hereinafter described and broadly covered in the claims.

The drawing accompanying and forming part of this specification illustrates one practical commercial embodiment of the invention, but it will be understood as the scope of the invention is realized that structural features and combinations may be varied without departure from the true spirit and broad scope of the invention.

The figure in the drawing is a somewhat diagrammatic plan view of a rotary drilling outfit having the invention incorporated therein.

In this illustration, two Diesel engines are shown designated 1 and 2, arranged for directly driving the mud pumps 3, 4 and for directly applying their full power to the draw-works 5.

For the lighter operations, such as for driving the rotary table 6, for reversing the draw-works and carrying out the lighter operations ordinarily effected with the rotary table and/or the draw-works, there is provided from the engines a variable reversible transmission. This variable flexible transmission may be of electrical design, pneumatic, hydraulic, or the like. In this particular case, the flexible drive from the motors to the rotary and draw-works is of the hydraulic type involving a pump or driving motor unit 7, operated from the engines and a driven motor unit 8, connected to drive the rotary and draw-works. The driving unit of the flexible transmission is equipped with a controller indicated generally at 9, by which the reversal and speed of operation of the driven unit 8 in both directions is governed. These hydraulic motor units and control may be of the more or less standard types now on the market. It is therefore unnecessary to enter into detailed description of the same other than to state that the driving and driven units are connected by piping 10 and the controller is such that when the driving unit is operated, the driven unit may be started, stopped, reversed and caused to operate through a wide range of speed in both directions. If variable speed electric or mechanical gear transmissions are substituted here for the hydraulic transmission, they will have the same general characteristics as to variability of speed, reversibility, etc. Preferably, also the reversible and variable speed transmission will, as in the case of the hydraulic transmission indicated, have power limiting means, whereby it will transmit only a predetermined selected horsepower, thus to prevent twistoffs or other damage which might result from excess power from the Diesel engines.

Each of the engines may be of sufficient power for operating one of the pumps and the rotary, in ordinary drilling formations and the two are of sufficient power, when compounded, to rapidly hoist the drill pipe out of a deep hole, and also preferably sufficient to operate both pumps and the rotary, when that may be necessary.

The engines may be duplicates and are indicated as such in the present illustration, except for the fact that one turns left-handedly and the other right-handedly. This arrangement enables the engines to be located on the same bed 11 in end-to-end, back-to-back relation, with the crank shafts in alignment, thus eliminating the need for a compounding gear box, such as illustrated in Fig. 1 of the Sheldon Patent 1,832,841, where the both engines turn in the same direction.

The engines, as customary, have individual clutches indicated 12, 13 and these are of the type which may be held out of engagement to leave either engine entirely disconnected. The clutch driven shafting 14, 15 of the engines, carry jaw or equivalent clutches 16, 17, by which the drives 18, 19, to the respective pumps 3, 4, may be thrown into or out of operation. In line with the clutch shafting is an intermediate section of shafting 20, parted from the clutch shafting as indicated at 21, 22 and adapted to be coupled to the clutch shafting at either end by jaw or equivalent clutches 23, 24. From this intermediate shafting which can thus be coupled up with either or both engines, a heavy drive connection 25 is taken to the line shafting 26.

On the line shafting 26, a drive clutch 27 is mounted, capable of carrying the full power of both engines and operating the drive 28 to the line shaft 29 of the draw-works 5. This heavy duty clutch may be of the friction type, so that it may be quickly thrown in and out.

The hydraulic driving unit 7 is shown as directly driven from the heavy duty or main clutch shaft 26 through an independently controllable clutch 30, so that it may be cut into or out of service as desired.

Similarly, the driven motor unit 8 of the hydraulic couple is shown as equipped with a clutch 31, by which it may be connected with or disconnected from the rotary drive shafting 32. This motor unit and shafting may be mounted below the derrick floor or otherwise conveniently positioned to be out of the way of operations around the rotary.

The clutch 33 on shafting 32, controls the drive 34 from the hydraulic motor unit 8 to the pinion shaft 35 of the rotary and another independently operable clutch 36 controls the drive 37 from shaft 32 to the line shaft 29 of the draw-works.

Suitable actuating devices are provided for the various clutches and these may be of the "remote" control type, conveniently grouped to enable the driller to set and release the different clutches from a convenient control position.

Thus the main friction clutch is shown as actuated by control connections 38, brought to a stand adjoining the draw-works; the rotary throw-out clutch 33 is shown having actuating connections 39 brought to the same control station; the draw-works driving clutch 36 is indicated as having control connections 40, extended to the same station and the control 9 for the hydraulic driving unit 7 is illustrated as having governing connections 41 extended to the control station.

These several remote control connections may be mechanical, electrical, pneumatic, or the like, the latter being particularly feasible because of stored compressed air used with the Diesel engines.

Suitable control handles may be provided, such as the handle indicated at 42 for reversing and controlling speed of the driving unit 7 of the hydraulic transmission, lever 43 for controlling operation of the rotary from the driven hydraulic unit 8 and handle 44, which when shifted into engagement with lever 45, may be utilized to control the main friction clutch, or, when shifted into engagement with the lever 46, be used to control drive of the draw-works from the hydraulic transmission. The purpose of this selective coupling of handle lever 44 with parts 45 or 46, is to prevent possibility of simultaneous operation of both the main friction clutch 27 and clutch 36, both driving the draw-works.

Operation

For ordinary drilling operations, where only one pump is required and one engine is of sufficient power for operating both the pump and the rotary, either engine alone may be used and either one of the pumps be employed. Thus engine 1 with clutch 16 engaged may drive pump 3 and with clutch 23 engaged, drive the first hydraulic unit 7, which with clutches 30, 31 and 33 engaged causes the rotary to be turned, with the power for which these transmission units are set at the speed and in the direction determined by the hydraulic control 9. Then, with the pump continuously in operation, the speed torque and direction of movement of the rotary table can be accurately governed to suit existing conditions. At the same time, by closing clutch 36, the draw-works may be operated, as for performing some of the lighter tasks required of it. If pump 4 is to be used instead of pump 3, clutch 16 may be disengaged and clutches 24 and 17 be closed, with the clutch 13 of engine 2 open, to operate the pump 4 across the breaks in the aligned engine shafting. If desired, both pumps may be operated by leaving in clutch 16 when effecting the last described clutching operations.

The engine 2 may be similarly used for driving either one or both of the pumps and for variably driving the rotary or both rotary and draw-works, or draw-works alone.

In coming out of the hole with a long string of pipe when the maximum power of the outfit may be required, both engines may be used, with or without operation of the pumps and the rotary, for by closing clutches 23 and 24, with the engine clutches 12, 13, set, the full power is directly transmitted to the main friction clutch 27, which when closed, transmits the full power to the line shaft of the draw-works. Thus when required, both engines may be compounded to quickly pull the pipe out of the hole or to carry on other heavy operations with the draw-works.

Diesel engines are particularly suited to this heavy work and can, through the direct mechanical connections described, apply a maximum of power to such heavy operations. Thus, these engines are made full use of for purposes to which they are best suited and the high efficiency of these engines is utilized to the best advantage. Variations in speed are not so important in this heavy work, the main feature of which is to apply a great flow of power for quickly getting the pipe out of the hole.

Reversing and varying of speed are needed for the lighter operations of kicking out the jaw clutches of the draw-works, tonging, making and breaking tool joints, etc., and these are accomplished simply and effectively at whatever speed or direction of rotation required through the flexible reversible drive connections, such as the variable speed reversible hydraulic transmission illustrated, from the engines to the rotary. The maximum power for quick heavy pulling is applied through simple and efficient rugged mechanical connections to the draw-works and reversal of parts and variations in speed, such as are necessary or desirable for whatever may be considered the lighter operations are effected through the variable drive connections, which in such case need only be of sufficient power capacity to handle such lighter loads. Thus, heavy expensive transmissions, which otherwise would have to be large enough to carry the maximum power output of the engines are avoided and at the same time, the lighter operations are effected with the exactness of control so much desired.

If mechanical drive to the rotary is required at any time, it will be observed that this may be effected by driving through main clutch 27 to the draw-works line shaft 29 and thence by drive 37 through clutch 36 closed, clutch 31 being at such time open to disconnect hydraulic unit 8.

The direct drive train, including the main clutch 27 and drive 28 is of sufficient capacity to carry the full power of both engines to the hoist mechanism, but the other train of connections through the variable speed transmission being only required for the lighter operations of drilling and hoisting, need not be of the same maximum power capacity. These two power trains may be utilized to operate one in conjunction with the other, thus certain operations be started through the variable speed transmission to bring the load up to speed and then the main clutch be thrown in to pick up and carry on, this avoiding engine stalling or other difficulties.

In such operations, the variable speed transmission is brought into action without throwing of any clutches, that is, other than necessary for substituting the one train of power connections for the other. The reversibility of the variable speed power transmission enables the elimination of heavy cumbersome reverse clutches or equivalent means.

The invention has the added advantages that practically all parts required may be of generally standard construction, requiring no special skill, other than proper understanding of the operation and capabilities of the same.

Certain advantages of the invention, it will be seen, may be attained with the use of only one engine and it will furthermore be apparent, that the parts may be changed about from the relations shown and other modifications be made, all within the true view of the invention.

At times, when using the full power of the engines to hoist the pipe out of the hole, it may be desirable to introduce fluid in the hole to take the place of the pipe withdrawn, to keep constant pressure on the walls of the formation, prevent caving, etc. The use of the large pumps at such time, when operating at the full speed of the engines, would be undesirable, because of the power consumed and excess of fluid over the actual requirements. Accordingly, there may be provided a smaller pump, such as that indicated at 47, which can be coupled to the flexible variable speed transmission system through a clutch indicated at 48 on the end of shaft 32. This pump can then be driven through the variable transmission at just the requisite speed to compensate for the withdrawing of the pipe and taking a minimum of power from the hoisting engines. This combination provides a general purpose pump, finding many uses around a rotary, one special use of which would be the pumping up of hydraulic cylinders used with hydraulic feeding equipments.

What is claimed is:

1. In apparatus of the character disclosed, the combination of a rotary and draw-works, multiple engine power therefor and power connections from the engines to the rotary and draw-works, including means for compounding the engines, direct mechanical connections for applying the power of the individual or compounded engines to the draw-works, and reversible variable speed power transmitting connections from the individual or compounded engines to the rotary and to the draw-works, with appropriate controls for said power connections.

2. In apparatus of the character disclosed, the combination of a rotary and draw-works, multiple engine power therefor and power connections from the engines to the rotary and draw-works, including means for compounding the engines, direct mechanical connections for applying the power of the compounded engines to the draw-works, and a single train of reversible variable speed power transmitting connections from the engines to both the rotary and the draw-works, with appropriate controls for said power connections.

3. In apparatus of the character disclosed, the combination of a rotary and draw-works, multiple engine power therefor and power connections from the engines to the rotary and draw-works, including means for compounding the engines, direct mechanical connections for applying the power of the compounded engines to the draw-works, reversible variable speed power transmitting connections from the engines to the rotary and to the draw-works, with appropriate controls for said power connections, said mechanical connections to the draw-works being of a capacity to carry the full power of the compounded engines and the variable reversible transmission being of less power capacity than that of the compounded engines and said controls including selective means for preventing simultaneous operation of both the mechanical and the reversible variable speed drives to the draw-works.

4. In combination, a rotary, draw-works and an engine, direct drive mechanical connections from the engine to the draw-works and variable speed reversible hydraulic drive transmission from the engine to the rotary, means for selectively governing said two driving trains and a controllable drive between rotary and draw-works.

5. In combination with a rotary and draw-works, a prime mover, direct mechanical drive connections from said prime mover to the draw-works, a variable speed reversible transmission from the prime mover to the rotary, drive means from said variable speed reversible transmission to the draw-works and means for variably controlling the operation of said driving connections.

6. In combination with a rotary and draw-works, a prime mover having a substantially constant speed characteristic, substantially constant speed drive connections from said prime mover to said draw-works, a variable speed drive transmission from said prime mover to said rotary, means for governing operation of said draw-works and rotary through said power connections and controllable drive connections from said variable speed transmission to the draw-works.

7. In apparatus of the character disclosed, the combination of rotary drilling mechanism, prime mover, invariable drive connections from said prime mover to said rotary drilling mechanism and including control means by which the same may be rendered operative or inoperative, and reversible, variable speed hydraulic drive connections from said prime mover to said rotary drilling mechanism and including control means by which the same may be disconnected from said prime mover when said invariable drive connections are in service or be connected with said prime mover and be substituted for the invariable drive connections aforesaid.

8. In apparatus of the character disclosed, the combination of rotary drilling mechanism, a prime mover, heavy-duty direct mechanical drive connections from said prime mover to said rotary drilling mechanism and including means by which the same may be rendered operative or inoperative, and lighter-duty variable speed hydraulic drive connections from said prime mover to said rotary drilling mechanism including control means by which the same may be disconnected from said prime mover when said heavy duty direct mechanical drive connections are in service or be connected with said prime mover and be substituted for the first mentioned drive connections.

9. In combination with separate loads varying widely between maximum and minimum, a prime mover, a flexible variable speed transmission from said prime mover to said loads and variable to start either or both loads and bring it or them up to certain speed, inflexible drive connections from said prime mover to said loads and operable to pick up and carry either or both loads started and brought up to speed by the flexible transmission, said driving trains including control mechanism by which one train of connections may be substituted for the other, said prime mover comprising engines of the internal combustion type, and means for compounding same at will for applying all or only part of the power through the driving trains aforesaid.

10. In combination, a prime mover, hoist mechanism for pulling drill pipe out of a hole, fixed speed power transmission from the prime mover to said hoist mechanism, a pump and variable speed drive transmission from said prime mover to said pump and whereby said pump may be run at proper speed to keep the hole filled as the pipe is being withdrawn from the hole at substantially constant speed.

11. The herein disclosed combination of rotary and draw works, a reversible, driven hydraulic motor unit between and connected to drive in opposite directions said rotary and draw works, a pump driving unit connected with said reversible motor unit and arranged to the outer side of the draw works, shafting for driving said pump unit, a main heavy duty clutch on said shafting and connections from said clutch to said draw works, internal combustion engines in end-to-end relation at the outer side of said shafting, drive connections from said internal combustion engines to said shafting, pumps at the outer side of said engines, drive connections from said engines to said pumps and clutches and control connections enabling compounding or separate use of said engines for driving said pumps and draw works and for reversibly operating said rotary and draw works through said hydraulic drive or in one direction from the heavy duty clutch on said shafting.

12. The herein disclosed combination of rotary and draw works, a reversible, driven hydraulic motor unit between and connected to drive in opposite directions said rotary and draw works, a pump driving unit connected with said reversible motor unit and arranged to the outer side of the draw works, shafting for driving said pump unit, a main heavy duty clutch on said shafting and connections from said clutch to said draw works, internal combustion engines in end-to-end relation at the outer side of said shafting, drive connections from said internal combustion engines to said shafting, pumps at the outer side of said engines, drive connections from said engines to said pumps and clutches and control connections enabling compounding or separate use of said engines for driving said pumps and draw works and for reversibly operating said rotary and draw works through said hydraulic drive or in one direction from the heavy duty clutch on said shafting, a pump and means for coupling the same at will to said variable speed motor unit.

WALDO SHELDON.